US006942065B1

(12) United States Patent
Price

(10) Patent No.: US 6,942,065 B1
(45) Date of Patent: Sep. 13, 2005

(54) TREE-MOUNTED HUNTING BLIND

(75) Inventor: Terry L. Price, Sheridan, MI (US)

(73) Assignee: High House Blinds, LLC, Sheridan, MI (US)

( * ) Notice: Subject to any disclaimer, the term of this patent is extended or adjusted under 35 U.S.C. 154(b) by 0 days.

(21) Appl. No.: 10/703,727

(22) Filed: Nov. 7, 2003

(51) Int. Cl.[7] ............................................. A01M 31/00
(52) U.S. Cl. ..................................... 182/187; 135/901
(58) Field of Search ............................... 182/187, 188, 182/116; 135/901

(56) References Cited

U.S. PATENT DOCUMENTS

| | | | | |
|---|---|---|---|---|
| 1,515,831 A | * | 11/1924 | Bush | 182/188 |
| 3,116,808 A | * | 1/1964 | Riley | 182/129 |
| 3,822,813 A | * | 7/1974 | Carter | 224/154 |
| 4,069,891 A | * | 1/1978 | McClung | 182/187 |
| 4,120,379 A | | 10/1978 | Carter | |
| 4,134,474 A | * | 1/1979 | Stavenau et al. | 182/187 |
| 5,538,101 A | * | 7/1996 | Kempf | 182/116 |
| 6,553,725 B2 | * | 4/2003 | Washington | 52/64 |
| 2002/0078988 A1 | | 6/2002 | Valpredo | |
| 2003/0178255 A1 | * | 9/2003 | Auer | 182/187 |

* cited by examiner

*Primary Examiner*—Alvin Chin-Shue
(74) *Attorney, Agent, or Firm*—Northern Michigan Patent Law PLC

(57) ABSTRACT

An enclosed tree-mounted hunting blind supported in cantilever fashion off the side of a tree. The blind is a rigid, walled structure that is easily put up and taken down from the tree using its own cantilever support, and is light enough to transport to and from the tree at the beginning and end of hunting season with minimal effort. The assembled, tree-mounted blind, however, is as stable as a permanently mounted structure and offers the protection and comfort of a ground blind in a tree.

15 Claims, 7 Drawing Sheets

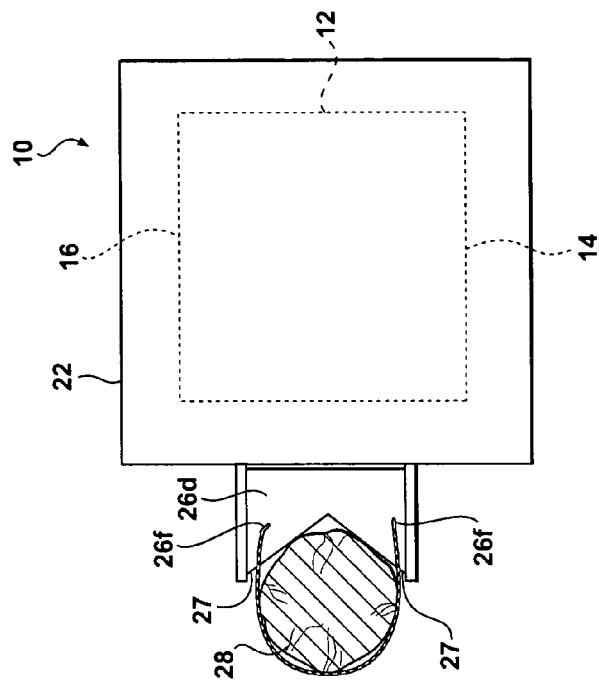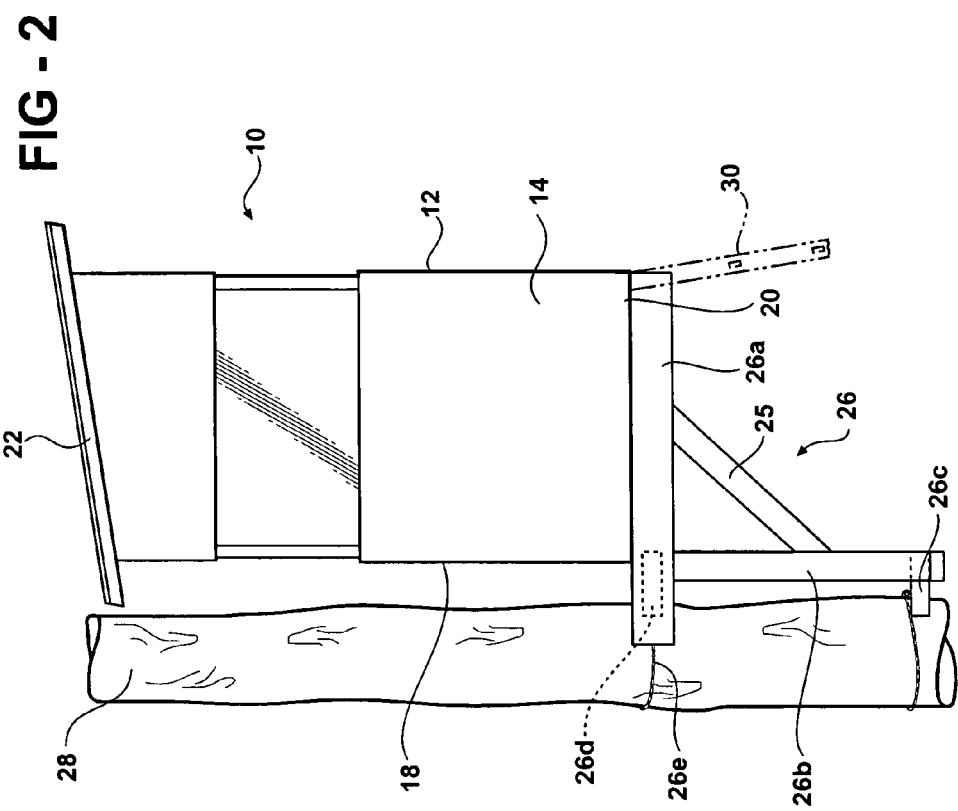

TREE-MOUNTED HUNTING BLIND

FIELD OF THE INVENTION

The present invention is in the field of hunting blinds of the type used by deer hunters.

BACKGROUND OF THE INVENTION

Deer hunters often use hunting blinds to hide themselves in locations on the ground near expected deer paths. The blind usually has at least one "wall" formed from natural materials at hand such as sticks and foliage, or from dull-colored blankets or burlap material hung between poles or on a frame, or from plywood or lumber. The blind may be a portable camouflaged tent, or even an abandoned appliance or vehicle to whose presence deer have become accustomed. Blinds may be but one wall between the hunter's hiding spot and the deer, or may partially or fully surround the hunter for concealment from several angles or for weather protection in the colder fall and winter seasons when most deer hunting takes place. More elaborate blinds with shingled roofs, doors, sliding or hinged windows, chairs and benches are common, permanently located for use year after year.

Because hunters have long recognized that hunting from above the deer's field of vision is advantageous, treestands are also popular, especially with bowhunters. Treestands are platforms, often of metal or plastic grating or mesh, mounted in trees. They are typically small and portable, with room for a single hunter to stand or sit. These open platforms must be used with caution, since a fall can be serious, and they often are used with safety belts or harnesses in case a hunter loses his balance or nods off in his perch. Treestands tend to be favored by bowhunters because bowhunting often takes place in warmer weather and the stands are exposed to the elements, and because bowhunters need more space to nock arrows, draw, and shoot than do firearm hunters.

One approach taken by rifle hunters has been to build tower-type blinds that allow them to sit all day in relative comfort and greater safety well above the ground. These are usually expensive, heavy, and cumbersome, and if designed to be taken down at the end of a season require significant labor and transport. Firearm hunters have also used tree-house type blinds built directly into trees.

BRIEF SUMMARY OF THE INVENTION

The present invention is a walled, blind-style hunting enclosure removably mounted to the side of a tree in cantilever fashion. The enclosure is fully walled and in a preferred version is also roofed, yet is lightweight, easy to put up, and easy to take down. One wall of the enclosure is mounted adjacent the side of the tree trunk, while another wall has door access from a ladder. The blind and its cantilever support are designed to be assembled at the base of the tree to which it is to be mounted, and hauled vertically up and down the side of the tree trunk to be placed and secured in the desired hunting position.

Once installed against the trunk of a tree, the blind is supported entirely by the tree, and requires no supplemental supports. This allows the blind to move freely with the tree, for example in windy conditions.

The cantilever support is adapted to be fastened to the tree trunk at ground level to allow the blind to be assembled on it safely and conveniently, and then to guide the assembled enclosure vertically up the side of the trunk to a point where it can be refastened in its hunting position.

The walls of the blind are preferably formed in foldable, removable sections, for example foldable pairs, reducing assembly and disassembly time and making them easier to transport to and from the blind site. In one embodiment the floor of the blind is also foldable, and includes a channel defining the final shape of the blind and adapted to receive and align the wall sections accordingly.

In the roofed embodiments, the roof can be angled or gabled to keep water from dripping (and then freezing) onto the ladder. Windows that can be adjusted and opened from inside the enclosure are provided on each wall, including a wall facing the tree trunk.

These and other features and advantages of the inventions disclosed herein will become apparent upon further reading of the specification in light of the accompanying drawings.

BRIEF DESCRIPTION OF THE DRAWINGS

FIG. 2 is a side elevational view of the blind of FIG. 1.

FIG. 3 is a top plan view of the blind of FIG. 1, with the tree trunk sectioned.

DETAILED DESCRIPTION OF THE INVENTION

Figure 1:
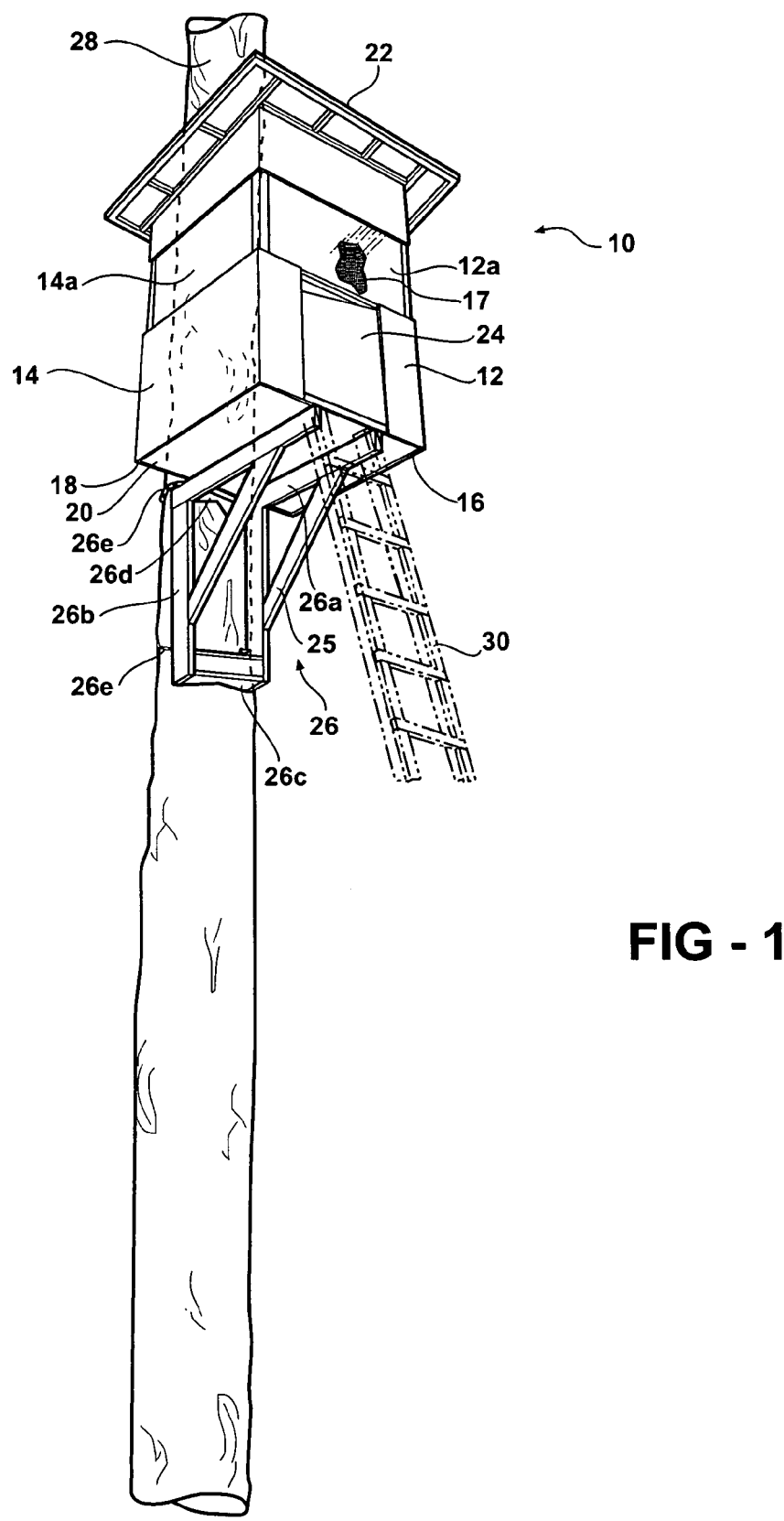
FIG. 1 is a front perspective view of a tree-mounted blind according to the invention, viewed from an angle below the level of the blind.

Referring to FIG. 1, a tree-mounted blind enclosure 10 according to the invention is shown mounted on a tree 28, for example between ten and twenty feet off the ground. Blind 10 is an enclosed structure, in the illustrated example a fully walled rectangular structure with front wall 12, side walls 14 and 16, and rear wall 18, all formed from suitable wood such as plywood with appropriate internal framing. It will be understood that the invention is limited neither to a rectangular shape nor to wood construction, although for most purposes this combination will not only be adequate but preferred. Walls made from other rigid materials such as plastics or even metals are possible, although wood is believed to be the best material. And as described in FIG. 6 below, other walled shapes such as hexagons may be desirable for certain features or appearances.

Each wall is provided with a window 12a, 14a, 16a, 18a, openable from the inside of the blind in known manner. Two possible examples include partitioned sliding windows, and hinged windows that drop down when a latch is released.

Blind 10 has a solid floor 20 and a solid roof 22, for example also made from plywood and suitable framing members, thus providing a complete, weatherproof enclosure for a hunter in the tree. Access to the inside of blind 10 is through a door 24 formed in front wall 12, reached by ladder 30 depending from front wall 12. The ladder is preferably secured in place during the hunting season, but can also be removed and stored as desired between uses. The door can be placed in walls other than the front wall, depending on the desired angle of ladder access to the blind.

As shown in FIGS. 1 and 2, blind 10 is mounted in cantilever fashion to the side of the trunk of tree 28, supported on a generally L-shaped cantilever mount 26 so as to have rear wall 18 essentially squarely mounted next to the tree trunk. The floor of the blind rests on and is secured to horizontal cantilever arm portion 26a (in the illustrated embodiment comprising a pair of spaced, parallel wooden rails). Vertical support portion 26b is removably secured against the side of tree 28 via lower and upper anchor blocks 26c and 26d tensioned laterally against the tree trunk with suitably strong cables, chains, or straps 26e. Triangular bracing 25 is added to the L-shaped cantilever support for strength.

Blind 10 is accordingly supported in cantilever fashion directly adjacent the vertical tree trunk, essentially paralleling the trunk for an unobstructed view (and shooting, when the windows are opened) in all directions except through the back wall, which faces the tree trunk. Even then, rear wall 18 is provided with a full width window that in most cases will be wider than even large diameter tree trunks for a partial view and/or shooting field to either side of the trunk. If the blind is fastened to an exceptionally large tree trunk whose diameter is equal to or greater than the width of the rear window (a rarity in today's forests), the flat, squared relationship of the windowed wall to the rounded trunk, along with the spacing of the rear wall from the trunk due to the thickness of the cantilever support's anchor blocks, will provide at least some field of vision to either side of the trunk through the rear window.

It will be understood that the terms "horizontal", "vertical", and "parallel" used above in reference to the relationship of the cantilever support are used in a general and relative sense with respect to the tree and ground, since no tree is perfectly straight and vertical, and since the position of a given blind and its support will vary somewhat from one installation to another on different trees.

Figure 5:
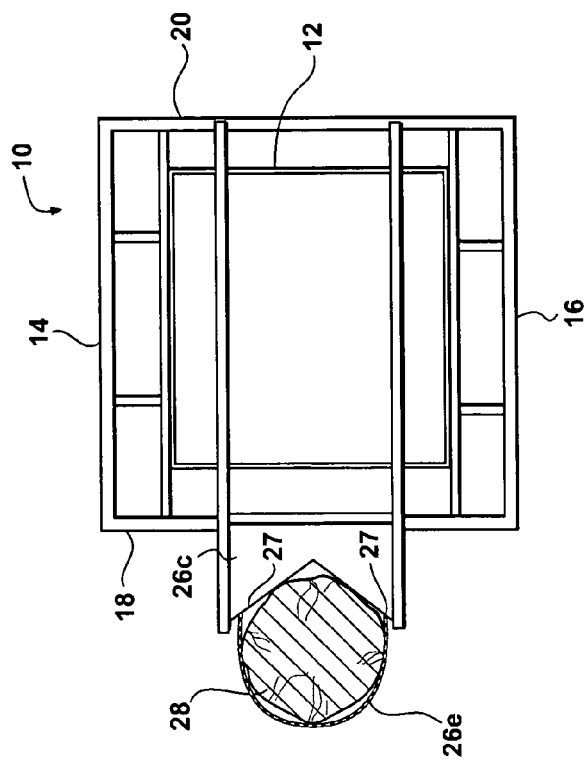
FIG. 5 is a bottom plan view of the blind of FIG. 1.
Figure 4:
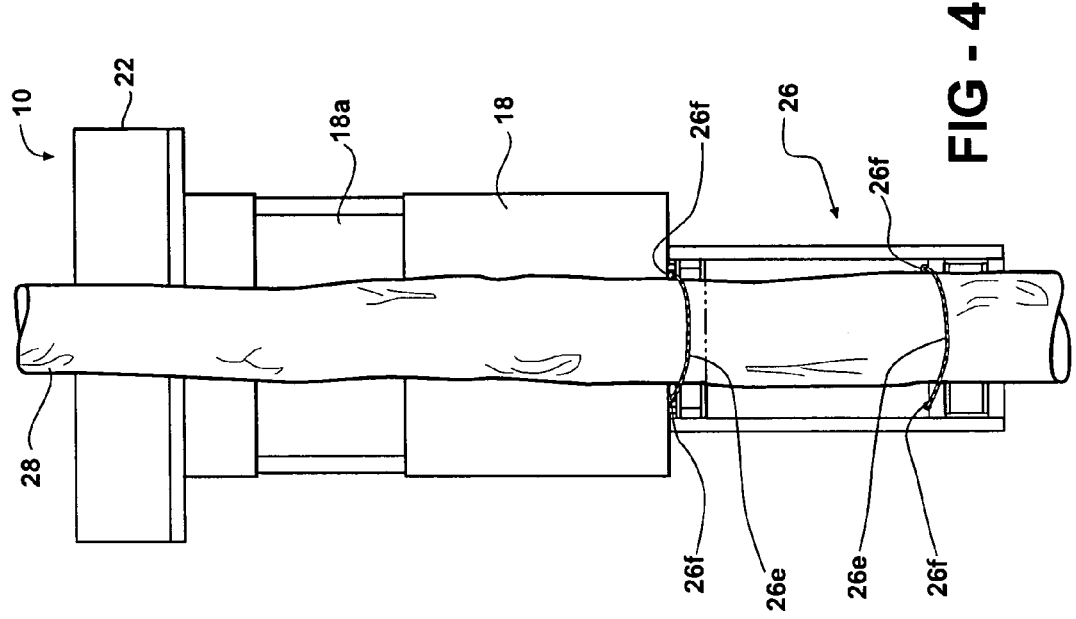
FIG. 4 is a rear elevational view of the blind of FIG. 1.

FIGS. 3 through 5 are top, rear, and bottom views of blind 10 and the section of the tree trunk to which it is fastened. The relationship of the rear wall 18 to the trunk 28 and the field of vision afforded through the rear window 18a are readily apparent (see FIG. 4). The cantilever support's anchor blocks 26c and 26d are shown in more detail in FIGS. 3 and 5, with wide, V-shaped tree-engaging faces 27 for a cradled, self-centering wedge fit against the trunk. In the illustrated embodiment, the anchor blocks are made from wood, providing non-damaging surfaces against the bark of the tree. In the illustrated embodiment the blocks are laminated with multiple layers of engineered lumber locked together into a block with framing members and nails, screws, clamping members and/or strong adhesive. Eyebolts 26f are secured deeply into the anchor blocks, with hooks or eyes on their protruding ends to receive the ends of chains, cables or straps that can be tensioned around the tree.

In the illustrated example, upper and lower anchor blocks 26c and 26d are identical. The wide and relatively shallow nature of the V-shaped anchor block faces 27, and their rigid vertical spacing on the trunk in a two-point tensioned connection, securely centers and locks the cantilevered mounting structure 26 (and blind 10) both vertically and laterally to the side of the tree. It will be understood that the angle and size of the V-shaped tree-engaging faces of the blocks could differ, but identical blocks have been found sufficient.

Figure 6:
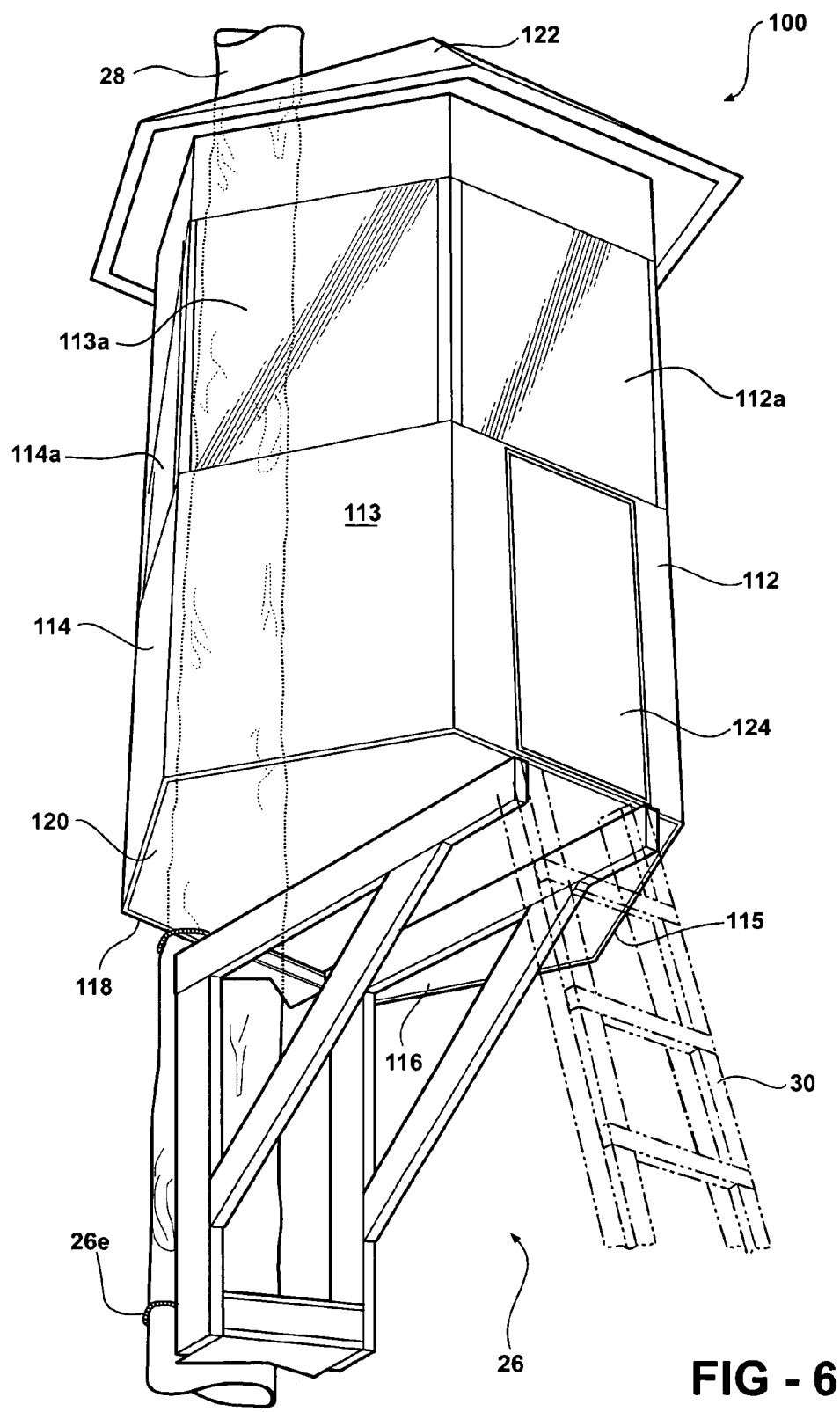
FIG. 6 is a front perspective view of an alternate embodiment of a blind according to the invention, viewed from an angle below the level of the blind.

FIG. 6 illustrates an alternate tree-mounted blind 100 according to the invention, similar to blind 10 in FIGS. 1 through 5 but hexagonal in shape. Like blind 10 it is fully enclosed by its six walls 112, 113, 114, 115, 116, 118 and corresponding windows 112a, 113a, etc.; its floor 120; and its roof 122. The door 124 is the same as in blind 10, as are cantilever mount structure 26 and ladder 30. The hexagonal shape is not only aesthetically pleasing in the visual context of the vertical, generally cylindrical tree, but offers a more finely gradated viewing and shooting field from the interior of the blind, better rear angle views around the tree trunk, and produces a smaller diameter and lighter blind for relatively the same interior comfort and usable space. The hexagonal shape also sheds wind better than a square-sided blind.

The hexagonal blind 100 of FIG. 6 is only one of many possible shapes that can be used for the enclosed blind structure, including but not limited to rectangles, octagons, and even cylinders. It is preferred, however, that the shape chosen have a flat rear wall facing the tree and a flat front wall for a door and ladder opposite the cantilever support on the tree trunk.

The enclosed, tree-paralleling shape of the blind and its cantilever mount to the side of the tree allow the blind to be assembled and installed on the tree in a unique and convenient manner. The blind's walls, floor, and roof portions are preferably constructed as separate modules or sections that are easily transported and that can be quickly assembled using ordinary hand or power tools at the base of a tree, for example by bolting or screwing the sections together. The cantilever support structure 26 is formed as a separate, stand-alone module that is easily transported to the tree, fastened to the base of the tree with its chains in the same manner shown higher up in FIGS. 1–6, and then used as an off-the-ground platform at a convenient height to assemble and secure the blind to the support structure.

Figure 7:
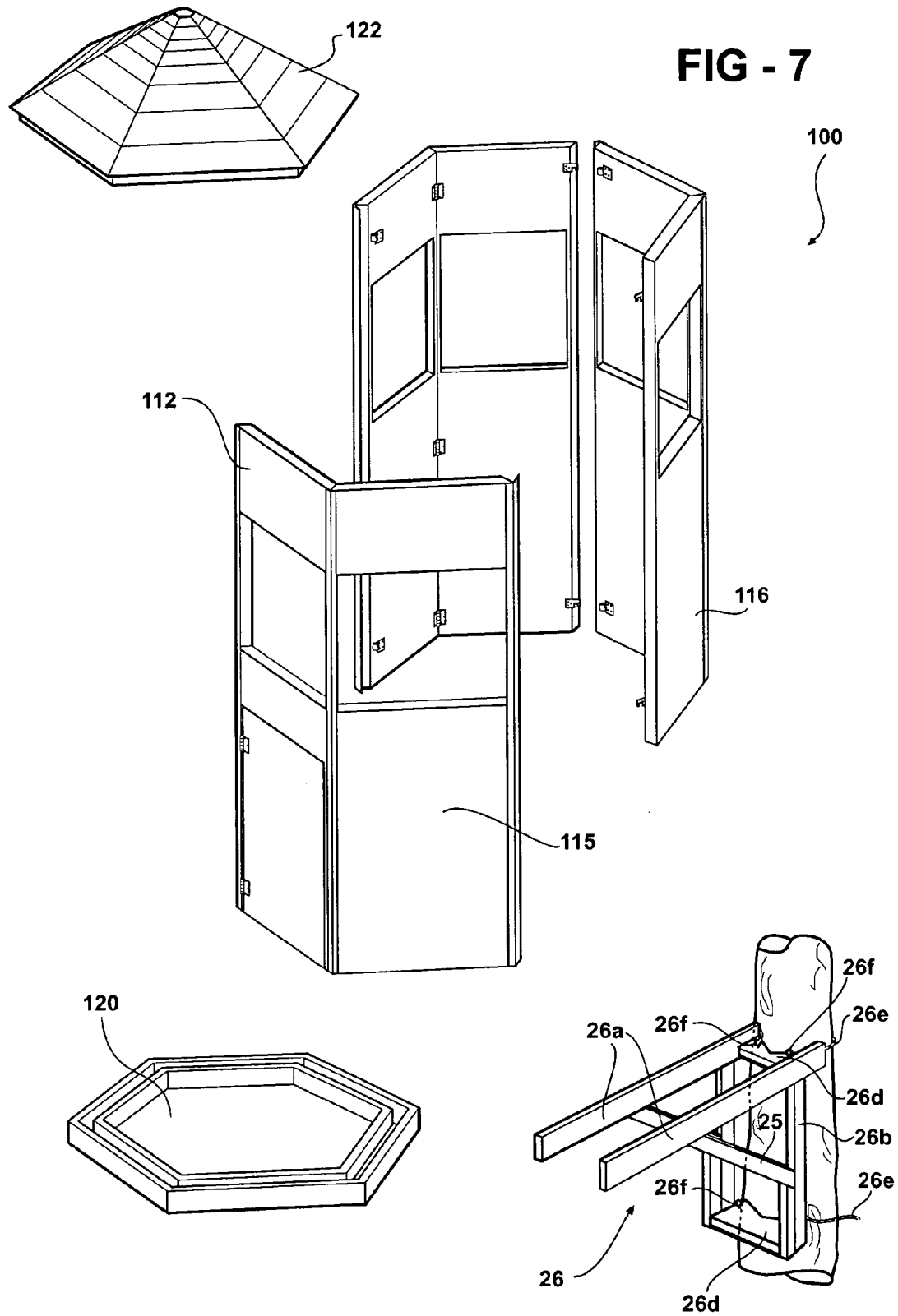
FIG. 7 is an exploded perspective view of the cantilever blind support from FIGS. 1–6 relative to the tree, and of the main assembly sections of the blind of FIG. 6 relative to the support.
Figure 7A:
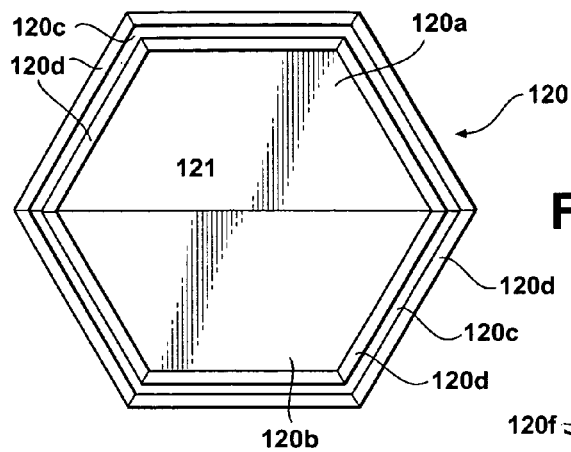
FIG. 7A is a top plan view of the base/floor of the blind of FIG. 6.
Figure 7B:
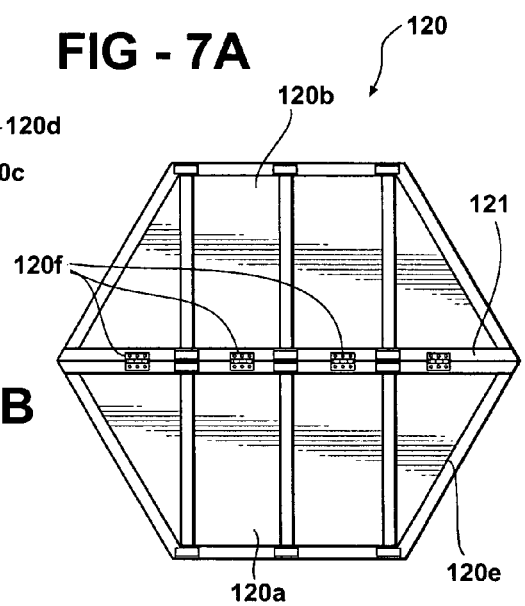
FIG. 7B is a bottom plan view of the base/floor of the blind of FIG. 6
Figure 7C:
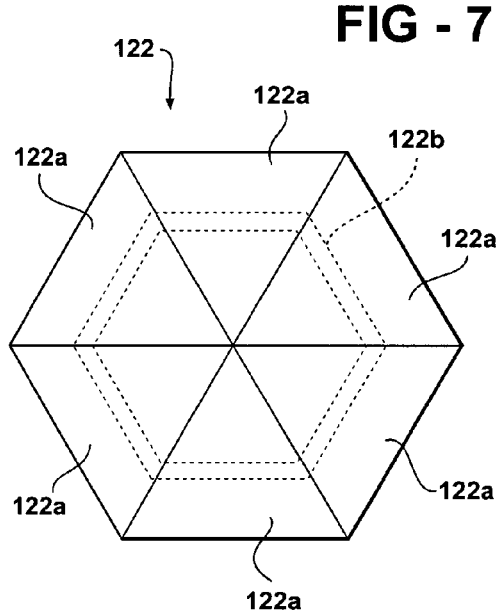
FIG. 7C is a top plan view of the roof of the blind of FIG. 6.

The hexagonal blind 100 shown in FIGS. 6 and 7 lends itself particularly well to a convenient modular assembly that is easy to transport to and from the blind site. As shown in FIG. 7, the flat rectangular walls 112–118 are formed in three hinged sections that fold flat for transport and that open up into freestanding sections to be positioned on and secured to floor 120. FIGS. 7A and 7B illustrate a preferred folding floor structure adapted to receive the hinged wall sections. Floor 120 has two symmetrical folding halves 120a and 120b, hinged along centerline 121 with hinges 120f on the underside base framing 120e so as to fold flat. The upper side of floor 120 has a wall-receiving channel 120c defined about its periphery by raised wooden frame members 120d. The wall sections are simply dropped into place in channel 120c and secured to one another and/or the floor, ready to receive roof 122 shown in FIG. 7C. Roof 122 is formed in six triangular sections 122a with roof anchor cleats 122b aligned to form a hexagon sized to fit inside the hexagonal walls and be secured thereto with removable fasteners.

Figure 8:
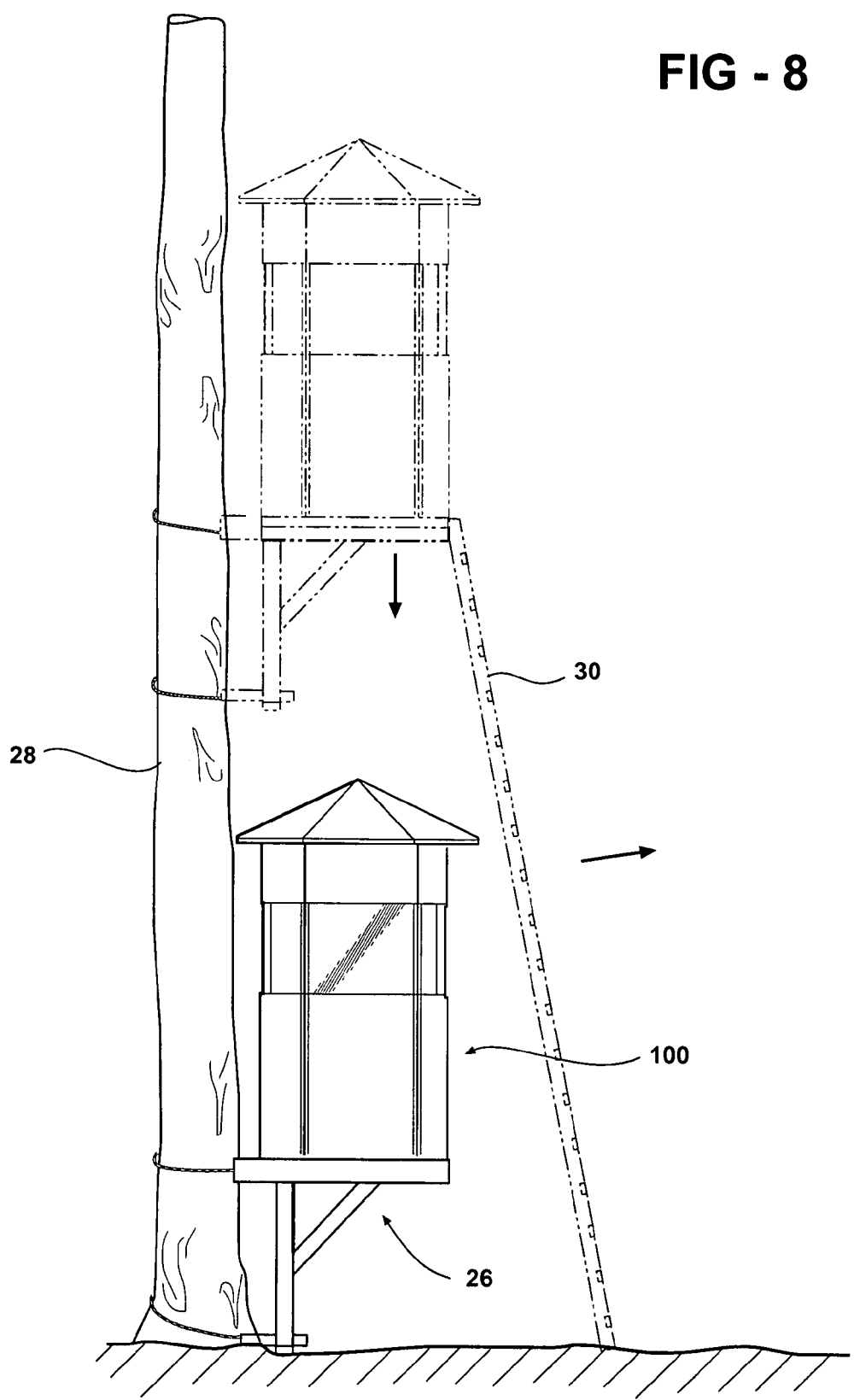
FIG. 8 is a side elevational view of the assembled blind and support of FIG. 1, showing it positioned at the bottom of the tree in solid lines, and in its raised position in broken lines.

FIG. 8 shows the fully assembled blind 100 and support 26 being raised as a unit straight up the side of the tree, for example with a hoist and/or pulley system anchored to the tree, the ground, and/or a vehicle. The wide V-shaped tree-engaging faces on the anchor blocks serve as guides and prevent undue rotation or twisting as the combined blind and support are raised into position. Once in position, the tensioning means secured to the blocks are simply tightened once again around the tree trunk to lock the blind in its final hunting position. The ladder can then be placed at the door of the blind.

It will be understood that the foregoing method for pre-mounting the cantilever support 26 to the tree and assembling the blind on the support at the base of the tree is not limited to hexagonal blind 100, but can be used for any shape of blind designed for use with support 26 against the side of a tree. For example, square blind 10 in FIGS. 1–5 can be assembled to support 26 in similar fashion. For a blind so assembled to be raised up along the trunk of the tree, however, it should be symmetrical, taller than it is wide, and of relatively small diameter to minimize twisting and swinging.

Figure 9:
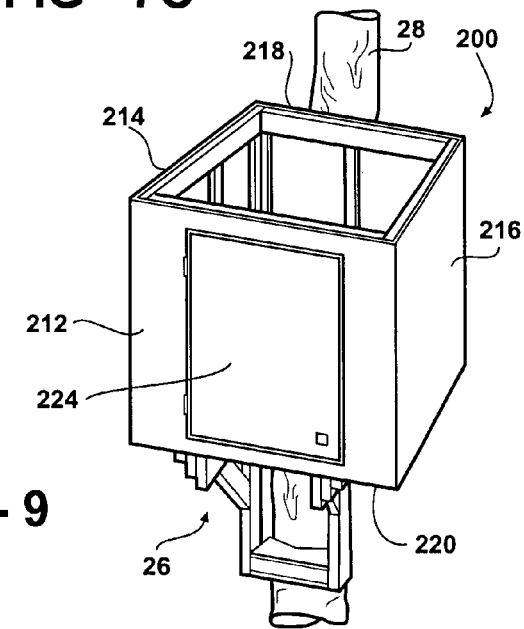
FIG. 9 is a front perspective view of an open-topped blind according to the invention.

FIG. 9 illustrates an enclosed, walled blind of a type more likely to be preferred by warmer weather hunters and bowhunters. Blind 200 is open-topped with four windowless walls 212, 214, 216, 218, a drainable floor 220, and a door 224. Blind 200 still provides a fully walled enclosure for the hunter, and is mounted on the same cantilever support structure 26 shown in FIGS. 1–8 for blinds 10 and 100. Its construction and materials are similar, except for the flooring which preferably allows rain, leaves and snow to fall through, for example by making the floor from expanded metal mesh, strong plastic grating, or wooden slats with spaces between them. Blind 200 can be assembled, raised, secured, and lowered in a manner similar to that described above for blinds 10 and 100.

It has been found that with the windowed blinds such as 10 and 100, draping a dull or camouflage colored piece of fine mesh such as mosquito or no-see-um netting over the inside surface of a window as shown at 17 in FIG. 1 effectively renders the hunter and his motion inside the blind invisible from the outside, yet able to see clearly enough to hunt. This mesh or screen also creates a mirror effect when viewed from the outside of the blind, such that the trees and sky are reflected in a non-game-spooking manner, adding to the concealment effect.

It will be understood by those skilled in the art that my invention is subject to various modifications not expressly disclosed in the preferred examples set forth above. Changes in materials, dimensions, and shapes; the specifics of framing, fasteners, and window and door closures; modifications to the cantilever support; and others that will be apparent now that I have explained the invention through these examples will be within the scope of the invention as claimed below. It will also be understood that although the invention is ideally suited and intended for hunting, it may be possible to put it to similar uses such as game and bird watching, for example. I accordingly claim:

What is claimed is:

1. A tree-mounted hunting structure comprising:
   a blind adapted to be removably supported in cantilever fashion from a side of a tree trunk, the blind comprising a rigid fully-walled blind enclosure and a cantilever support adapted to be connected to the side of a tree trunk, the cantilever support comprising a pair of substantially parallel spaced horizontal cantilever support arms and a pair of substantially parallel spaced vertical trunk arms in an inverted L-shape, the cantilever support and vertical trunk arms connected to and spaced by at least two anchor blocks vertically spaced on the vertical trunk arm, and tension means connected to the anchor blocks for removably and rigidly securing the vertical trunk arm in tension against to a side of a tree trunk, the blind enclosure resting on and secured to the cantilever support arm above the vertical trunk arm.

2. The tree-mounted hunting structure of claim 1, wherein the blind is removably secured to the cantilever support arm.

3. The tree-mounted hunting structure of claim 1, wherein the anchor blocks comprise an upper anchor block adjacent the upper end of the vertical trunk arm, and a lower anchor block adjacent the lower end of the vertical trunk arm.

4. The tree-mounted hunting structure of claim 3, wherein the anchor blocks comprise v-faced anchor blocks, each anchor block having a v-shaped tree engaging face and a tensioning device adapted to be wrapped around a tree trunk.

5. The tree-mounted hunting structure of claim 1, wherein the blind enclosure has a height and a diameter, and the height is greater than the diameter.

6. The tree-mounted hunting structure of claim 5, wherein the blind enclosure is symmetrical.

7. The tree-mounted hunting structure of claim 1, wherein the blind enclosure has a plurality of flat walls, and one flat wall faces the tree trunk.

8. The tree-mounted hunting structure of claim 7, wherein all of the flat walls are windowed.

9. The tree-mounted hunting structure of claim 1, wherein the cantilever support is capable of being secured to a tree trunk at ground level, the blind enclosure is capable of being secured to the cantilever arm at ground level, and the cantilever support with the blind enclosure secured thereto is capable of being detached from a tree trunk at ground level and raised vertically up the side of a tree trunk with the blind enclosure to a hunting position, and then re-secured to a tree trunk at the hunting position.

10. The tree-mounted hunting structure of claim 9, wherein the blind enclosure comprises a plurality of flat walls, the walls being formed in foldable sections that can be transported flat.

11. The tree-mounted hunting structure of claim 10, wherein the blind enclosure comprises a flat floor forming a base for the walls, the floor being foldable for flat transport.

12. The tree-mounted hunting structure of claim 9, wherein the anchor blocks comprise tree-engaging faces adapted to be tensioned against the side of the tree trunk, and to guide the cantilever support and the attached blind vertically up the side of the tree trunk.

13. The tree-mounted hunting structure of claim 12, wherein the anchor blocks comprise V-shaped tree engaging faces.

14. The tree-mounted hunting structure of claim 13, wherein the vertical trunk arm is connected to the cantilever support arm at right angles.

15. A method of mounting the tree-mounted hunting structure of claim 1 to a tree, comprising the steps of securing the cantilever support to the tree trunk at ground level, securing the blind enclosure to the cantilever support arm at ground level, detaching the cantilever support with the blind secured thereto from the tree trunk at ground level and raising the blind vertically up the side of the tree trunk to a hunting position, and then re-securing the cantilever support to the tree trunk at the hunting position.

\* \* \* \* \*